United States Patent
Moriyama (10) Patent No.: US 7,096,988 B2
(45) Date of Patent: Aug. 29, 2006

(54) SNOWMOBILE POWER STEERING SYSTEM (75) Inventor: Takashi Moriyama, Iwata (JP)

(73) Assignee: Yamaha Hatsudoki Kabushiki Kaisha, (JP)

(*) Notice: Subject to any disclaimer, the term of this patent is extended or adjusted under 35 U.S.C. 154(b) by 0 days.

(21) Appl. No.: 10/913,958

(22) Filed: Aug. 6, 2004

(65) Prior Publication Data
US 2005/0039961 A1    Feb. 24, 2005

(30) Foreign Application Priority Data
Aug. 8, 2003    (JP)    ............................. 2003-206780

(51) Int. Cl.
B62M 27/02    (2006.01)
B62M 29/00    (2006.01)

(52) U.S. Cl. .................. 180/190; 180/183; 180/184

(58) Field of Classification Search ................ 180/190, 180/183, 184
See application file for complete search history.

(56) References Cited

U.S. PATENT DOCUMENTS

| | | | |
|---|---|---|---|
| 3,584,592 A | 6/1971 | Perrine | 440/12.52 |
| 4,155,309 A | 5/1979 | Ames et al. | 105/456 |
| 4,488,615 A | 12/1984 | Millard | 180/428 |
| 4,719,982 A * | 1/1988 | Shaver | 180/183 |
| 4,826,184 A * | 5/1989 | Kuehmchel et al. | 280/21.1 |
| 5,921,343 A | 7/1999 | Yamakaji | 180/436 |
| 5,934,404 A | 8/1999 | DeLellis et al. | 180/436 |
| 6,202,781 B1 | 3/2001 | Ima | 180/252 |
| 6,234,263 B1 * | 5/2001 | Boivin et al. | 180/184 |
| 6,802,383 B1 * | 10/2004 | Nishijima | 180/190 |
| 2003/0089166 A1 | 5/2003 | Mizuno et al. | 73/118.1 |
| 2003/0132075 A1 | 7/2003 | Drivers | 188/350 |

FOREIGN PATENT DOCUMENTS

JP    64-074190    3/1989

OTHER PUBLICATIONS

Tanigaki et al. "Small Vehicle with Power Steering Assembly," co-pending U.S. Appl. No. 10/305,818, filed Nov. 26, 2002.

* cited by examiner

Primary Examiner—Lesley D. Morris
Assistant Examiner—Marlon Arce-Diaz
(74) Attorney, Agent, or Firm—Knobbe Martens Olson & Bear LLP (57) ABSTRACT A snowmobile comprises a frame assembly. An internal combustion engine is mounted to the frame assembly. A steering assembly is mounted to the frame assembly. The steering assembly comprises a steering shaft having a first portion and a second portion. The first portion of the steering shaft is coupled to a steering input mechanism. The second portion of the steering shaft is coupled to a power steering device. The power steering device is coupled to a steering linkage. The steering linkage is coupled to a steering ski.

29 Claims, 6 Drawing Sheets

SNOWMOBILE POWER STEERING SYSTEM

RELATED APPLICATIONS

This application is based upon and claims priority to Japanese Patent Application No. 2003-206780, filed on Aug. 8, 2003, which is hereby incorporated by reference in its entirety.

BACKGROUND OF THE INVENTION

1. Field of the Invention

The present invention generally relates to steering systems for vehicles. More specifically, the present invention relates to power steering systems for snowmobiles.

2. Description of the Related Art

With some snowmobiles, a rider straddles a seat and grips a steering handlebar provided in front of the seat. The steering handlebar typically is disposed in a position at an upper end of a steering shaft. The steering shaft usually is located centrally in a transverse direction of the vehicle. A lower end of the steering shaft is connected through a linkage mechanism to a pair of right and left steering skis. The steering shaft is supported for free rotation within a steering column. The steering column can be supported on a frame of the vehicle body. A snowmobile typically includes a drive track mechanism under the seat for propelling the snowmobile.

Turning the steering handlebar, while the snowmobile is traveling, transmits a steering force to the steering skis through the steering shaft and the linkage mechanism. The steering skis turn in response to the steering force. The weight of the front part of the snowmobile acts on the steering skis. Additionally, the forces generated while traveling forward also act on the steering skis. Such forces can make it difficult to turn the handlebar of the snowmobile, especially if the snowmobile is large and is traveling at high speeds.

A power steering device reduces the amount of force that a user must provide to steer the snowmobile. A power steering device includes an electric motor to generate additional steering force. The power steering device has an input shaft on a first end facing the rear of the vehicle body and an output shaft on a second end facing the front of the vehicle body.

In a snowmobile, the rear part of the vehicle body is supported by the drive track mechanism located generally centrally in the transverse direction of the vehicle. The weight of the front part of the vehicle body preferably is balanced in the transverse direction of the vehicle. In some cases, a power steering device is positioned on one side of the vehicle body.

The input shaft of the power steering device typically is connected to the steering shaft through a universal joint located generally centrally in a transverse direction of the vehicle. The output shaft extends toward the front of the vehicle body, and its front end connects to a rack and pinion type steering system near a front portion of the vehicle.

SUMMARY OF THE INVENTION

One aspect of the present invention includes the realization that the typical structures and arrangements of power steering devices as used on some vehicles presents problems with balance and performance when used on some snowmobiles. For example, if a power steering device is positioned on one side of the vehicle body, an offsetting weight is required on the opposite side of the vehicle body for balance. This can limit the positional freedom in mounting components on a snowmobile. Additionally, if a universal joint is provided as described above, play is typically present in the universal joint interposed between the input shaft and the steering shaft. Play in the universal joint delays the operation of the power steering device with respect to the steering force generated by turning the steering handlebar. Thus, although the force required for steering the snowmobile can be reduced by including a power steering device, the response characteristic may be slow.

Accordingly, in another aspect of the present invention, a snowmobile has a power steering device that makes it easy to balance weight in the transverse direction of the vehicle, without significantly reducing the response characteristic.

In another aspect, a snowmobile comprises a frame assembly. An internal combustion engine is mounted to the frame assembly. A steering assembly is mounted to the frame assembly. The steering assembly comprises a steering shaft having a first portion and a second portion. The first portion of the steering shaft is coupled to a steering input mechanism. The second portion of the steering shaft is coupled to a power steering device. The power steering device is coupled to a steering linkage. The steering linkage is coupled to at least one steering ski.

In another aspect, a snowmobile comprises a frame assembly. An internal combustion engine is mounted to the frame assembly. A steering assembly is mounted to the frame assembly. The steering assembly comprises a steering shaft having a first portion and a second portion. The first portion of the steering shaft is coupled to a steering input mechanism. The second portion of the steering shaft is directly coupled to an input shaft of a power steering device. An output shaft of the power steering device is coupled to a steering linkage. The steering linkage is coupled to at least one steering ski.

In another aspect, a snowmobile comprises a frame assembly. An internal combustion engine is mounted to the frame assembly. A steering assembly is mounted to the frame assembly. The steering assembly comprises a steering shaft having a first portion and a second portion. The steering shaft is positioned generally about a longitudinally and vertically extending center plane of the snowmobile. The first portion of the steering shaft is coupled to a steering input mechanism. The second portion of the steering shaft is coupled to a power steering device. The power steering device is positioned generally about the longitudinally and vertically extending center plane of the snowmobile. The power steering device is coupled to a steering linkage. The steering linkage is coupled to at least one steering ski.

In another aspect, a snowmobile comprises a frame assembly. An internal combustion engine is mounted to the frame assembly. A steering assembly is mounted to the frame assembly. The steering assembly comprises a steering shaft having a first portion, a second portion and a steering axis. The first portion of the steering shaft is coupled to a steering input mechanism. The second portion of the steering shaft is coupled to a power steering device. The power steering device comprises an electric motor having a motor axis. The motor axis is oriented generally normal to the steering axis. The power steering device is coupled to a steering linkage. The steering linkage is coupled to at least one steering ski.

In another aspect, a snowmobile comprises a frame assembly. An internal combustion engine is mounted to the frame assembly. A transmission system is coupled to the engine. A drive track system is disposed below a seat portion. The drive track system is coupled to the frame assembly and coupled to the transmission system. The drive track system comprises a drive track belt and a drive track suspension system. A steering assembly is mounted to the frame assembly. The steering assembly comprises a steering shaft having a first portion and a second portion. The first portion of the steering shaft is coupled to a steering input mechanism. The second portion of the steering shaft is coupled to a power steering device. The power steering device is coupled to a steering linkage. The steering linkage is coupled to at least a pair of steering skis.

In another aspect, a snowmobile comprises a steering handlebar coupled to a steering shaft. The steering shaft is coupled to a power steering device. The power steering device is coupled to a steering linkage. The steering linkage is coupled to a pair of steering skis. A steering force can be transmitted from the steering handlebar through the steering shaft, the power steering device, and the steering linkage to the steering skis. The power steering device can be coupled to a lower end of a steering column. The steering column can house the steering shaft and support the steering handlebar. The power steering device preferably is located generally centrally in the transverse direction of the vehicle. Other components preferably are not required to balance weight in the transverse direction of the vehicle. The power steering device preferably has an input shaft coupled directly to the steering shaft.

In another aspect, a pair of steering skis are provided in positions on both sides of an engine. The power steering device is located above and behind the engine. The engine can function as a shield to inhibit snow from adhering to the power steering device.

In another aspect, the steering column is provided generally centrally in the transverse direction of the vehicle. The power steering device preferably comprises an electric motor. The electric motor preferably extends toward the front of the vehicle body. The electric motor, which can be relatively heavy among the components of the power steering device, preferably is located generally centrally in the transverse direction of the vehicle.

In another aspect, the engine is mounted in a position in front of the steering column on the vehicle body frame. The cylinder axis is sloped upward and to the rear. The electric motor of the power steering device extends above the engine. The center of gravity of the vehicle body is located in the vicinity of the engine and mass is concentrated near the center of gravity of the vehicle body.

BRIEF DESCRIPTION OF THE DRAWINGS

These and other features, aspects and advantages of the present invention will be better understood with reference to a preferred embodiment, which is illustrated in the accompanying drawings. The illustrated embodiment is merely exemplary and is not intended to define the outer limits of the scope of the present invention. The drawings of the illustrated arrangement comprise six figures.

DETAILED DESCRIPTION OF THE PREFERRED EMBODIMENT

Figure 1:
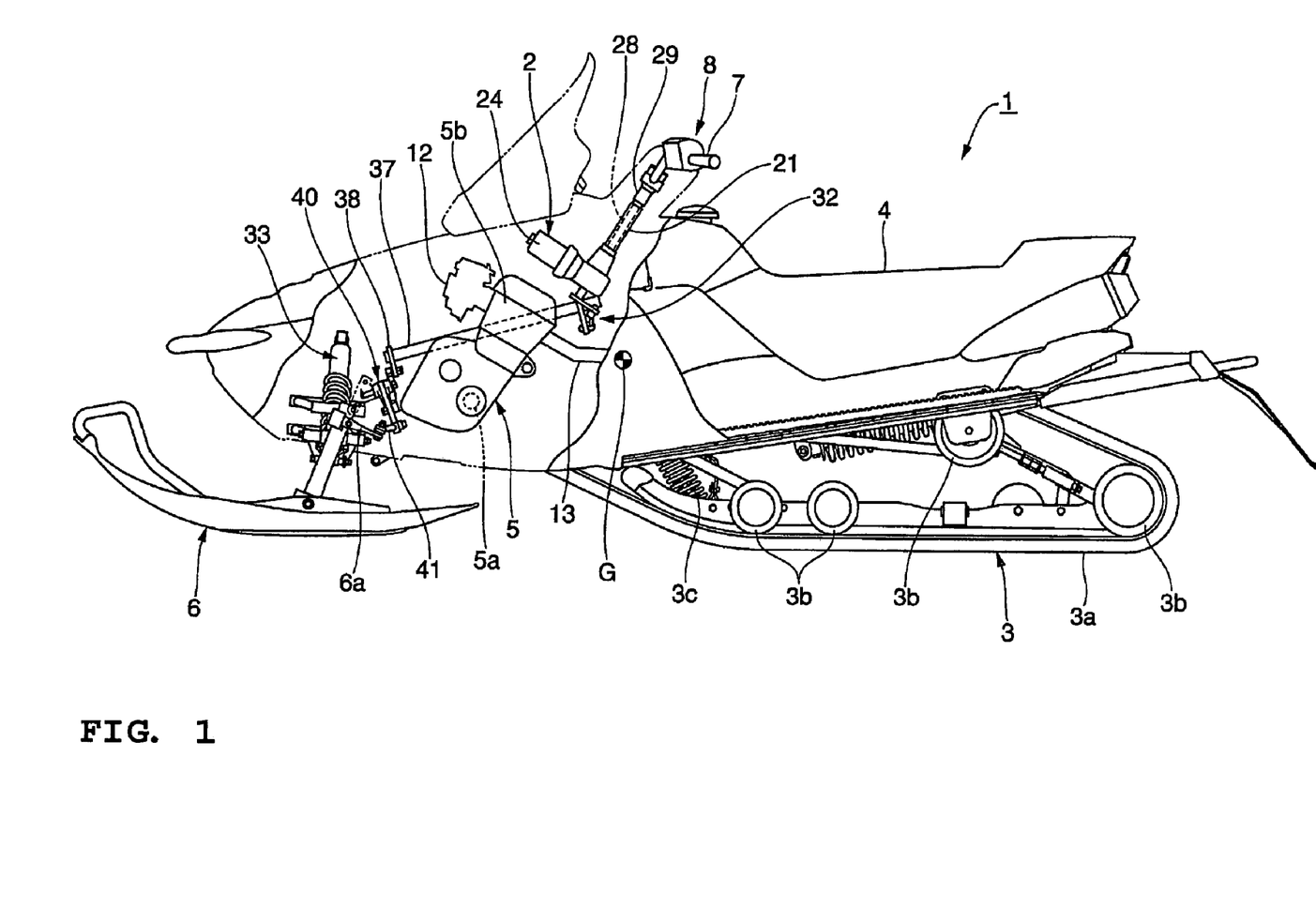
FIG. 1 is a schematic side elevational view of a snowmobile with certain portions broken away and other internal portions shown in solid and hidden lines to better illustrate certain features, aspects and advantages of one preferred embodiment of the present invention.

With reference now to FIG. 1, one embodiment of a snowmobile having certain features, aspects and advantages of the present invention will be described. The snowmobile, indicated generally by the reference numeral 1, is an environment for which many features, aspects and advantages of the present invention have been specially adapted. Nevertheless, certain features, aspects and advantages of the present invention can be used with other vehicles.

The snowmobile 1 generally comprises a frame assembly 9 (see FIG. 3) that carries a number of other components of the snowmobile 1. A forward body cover is disposed over a forward portion of the frame assembly 9. The forward body cover defines, in part, an engine compartment in which an engine 5 is mounted. The engine 5 will be described in greater detail below.

A windshield is disposed over a mid-portion of the body cover. The windshield provides some degree of protection for the riders from wind and other elements during operation of the snowmobile 1. Rearward of the windshield, a fuel tank is mounted to the frame assembly 9 in a manner that allows the body cover and the fuel tank to blend together for aesthetic reasons.

Rearward of the fuel tank, a seat 4 is mounted to the frame assembly 9. Forward of the seat 4 and the fuel tank is a steering assembly 8. The steering assembly includes a steering handlebar 7 in some embodiments. Other suitable steering input mechanisms can also be used, such as, for example, a steering wheel or a joystick-type device. The steering handlebar 7 can carry appropriate controls. The steering assembly 8 is coupled to a pair of front skis 6 as described in more detail below. Manipulation of the steering handlebar 7 causes the direction of the snowmobile 1 to be altered, as will be discussed in more detail below. The skis 6 are mounted to the frame assembly 9 through a front suspension assembly 33. Any suitable front suspension assembly 33 can be used.

The engine 5 drives a drive track device 3 that is commonly used in the snowmobile industry, which is described further below. As is known in the snowmobile industry, components of the drive track device 3 can be mounted to the frame assembly with a rear suspension system. Any suitable rear suspension system can be used.

Many of the above-described components are generally conventional and can be arranged and configured in any suitable manner. Additionally, the above-described components can be replaced by other suitable components where desired. Any details omitted to this point have been considered well within the design knowledge of those of ordinary skill in the art.

Figure 2:
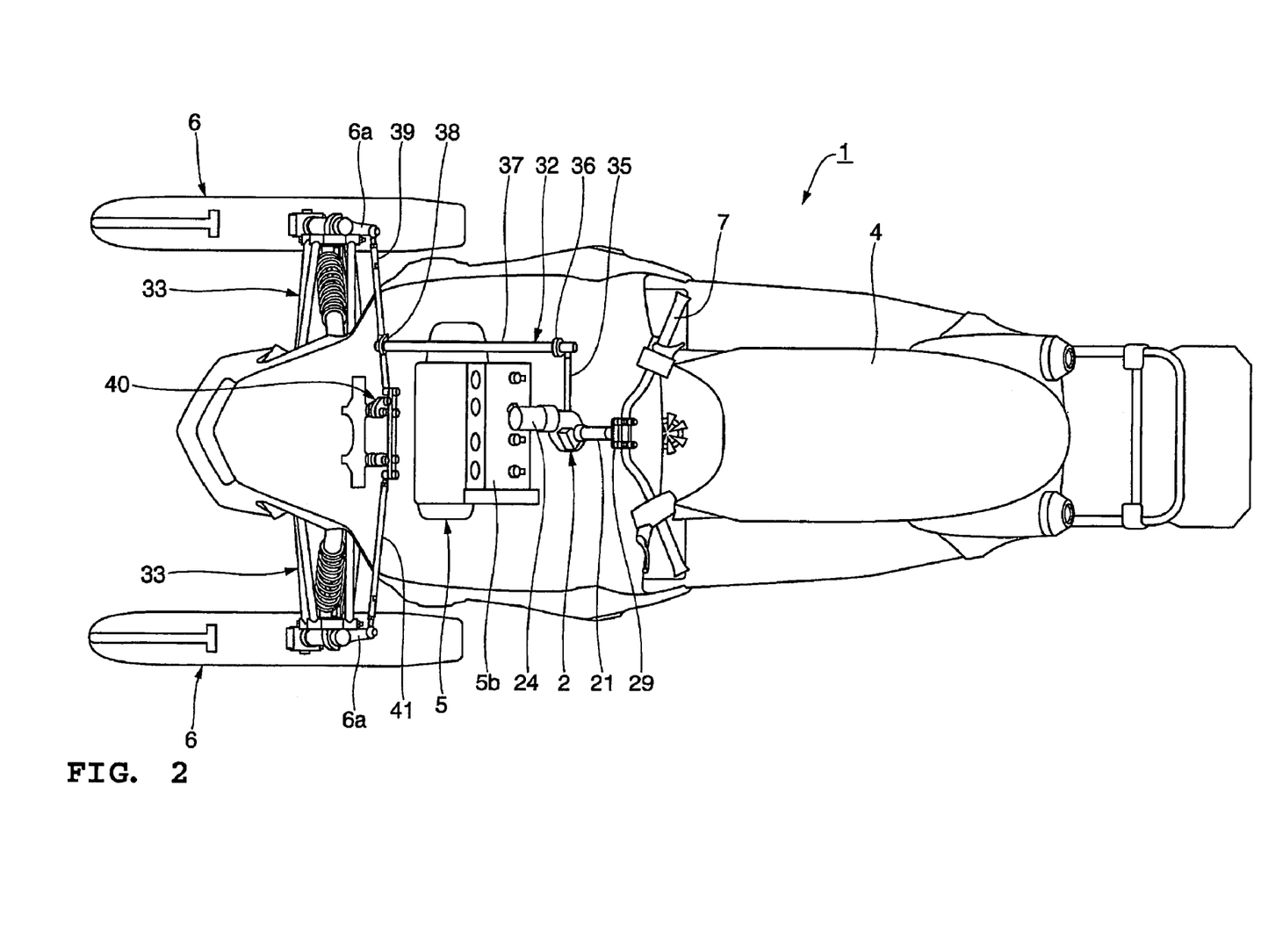
FIG. 2 is a schematic plan view of the snowmobile of FIG. 1.

With reference to FIGS. 1 and 2, the snowmobile 1 includes a power steering device 2 configured in accordance with a preferred embodiment of the invention. The rear part of the vehicle body preferably includes the drive track device 3, and the seat 4, located generally centrally in the transverse direction of the vehicle. The engine 5 is mounted in the front part of the vehicle body to drive the drive track device 3. The right and left steering skis 6 are coupled with the steering system 8 in the front part of the vehicle body.

Figure 3:
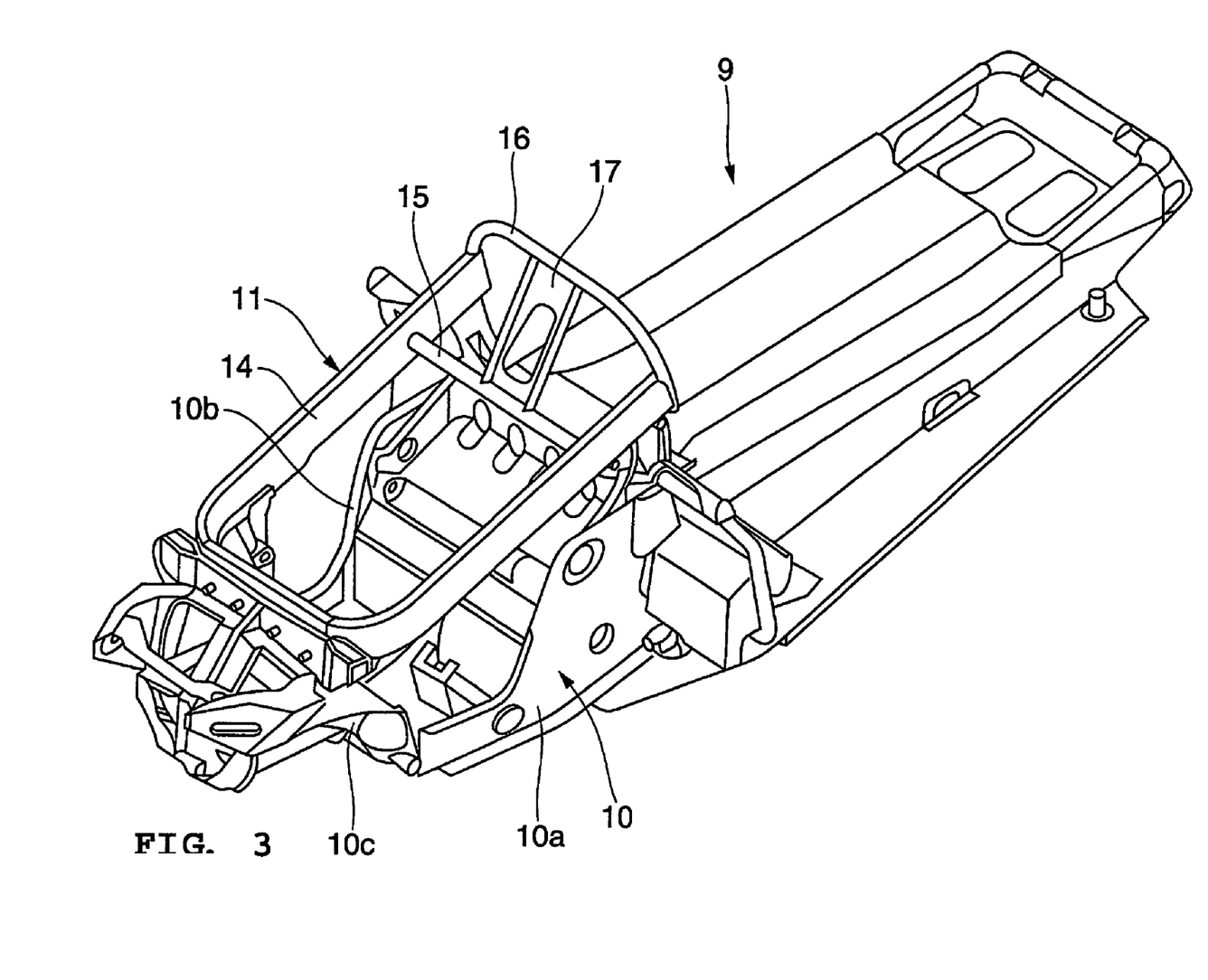
FIG. 3 is a perspective view of a vehicle body frame of the snowmobile of FIG. 1.

The drive track device 3, as described above, can have any suitable configuration. The drive track device 3 supports the rear part of the vehicle body frame 9 (FIG. 3). The drive track device 3 comprises a track belt 3a for driving the vehicle, wheels 3b for supporting the track belt 3a, and coil springs 3c for suspension.

With reference to FIG. 3, in one embodiment, the vehicle body frame 9 preferably is a monocoque frame. The vehicle body frame 9 can be constructed by welding together aluminum plate members and pipes. A lower frame 10 and an upper frame 11 preferably project forward at the front end of the vehicle body. The lower frame 10 is made up of paired right and left plates 10a, 10b, and a cross member 10c interconnecting the front ends of the right and left plates 10a, 10b, to support the engine 5.

The engine 5, as shown in FIG. 1, is water-cooled. The engine 5 has four cylinders and a four-stroke cycle. In some arrangements, engines having differing numbers of cylinder bores, different cylinder bore configurations (e.g., V, opposing, etc.), different orientations (e.g., vertical) and different operating principles (e.g., two-stroke, rotary, etc.) can be used. The engine 5 is mounted on the lower frame 10. The axis of an engine crankshaft 5a preferably is directed in the transverse direction of the vehicle. The axis of the cylinder 5b preferably is inclined and slopes upward and rearward. The engine 5 is mounted generally centrally in the transverse direction of the vehicle body. The engine 5 preferably is positioned horizontally generally between the right and left steering skis 6, and vertically between the steering skis 6 and the steering handlebar 7. With reference to FIG. 1, as a result of mounting the engine 5 in this way, the center of gravity G of the snowmobile 1 is located in the vicinity of the rear part of the engine 5. The engine 5 could have other orientations in some embodiments, for example, the engine 5 can be positioned so that the crankshaft 5a is directed in the longitudinal or vertical direction of the vehicle, and still use some of the aspects of the present invention.

In the illustrated embodiment, one or more intake ports are located on a front side of the cylinder 5b. The intake ports of the cylinder 5b are connected to a carburetor 12. The exhaust ports of the cylinder 5b are connected to an exhaust pipe 13. The carburetor 12 and the exhaust pipes 13 preferably are coupled to each cylinder. Two of the exhaust pipes 13 are coupled to the two cylinders on the left side of the vehicle body. Another two of the exhaust pipes 13 are coupled to the two cylinders on the right side of the vehicle body. The exhaust pipes 13 preferably are joined together to extend below the seat 4 to the rear part of the vehicle body.

Figure 5:
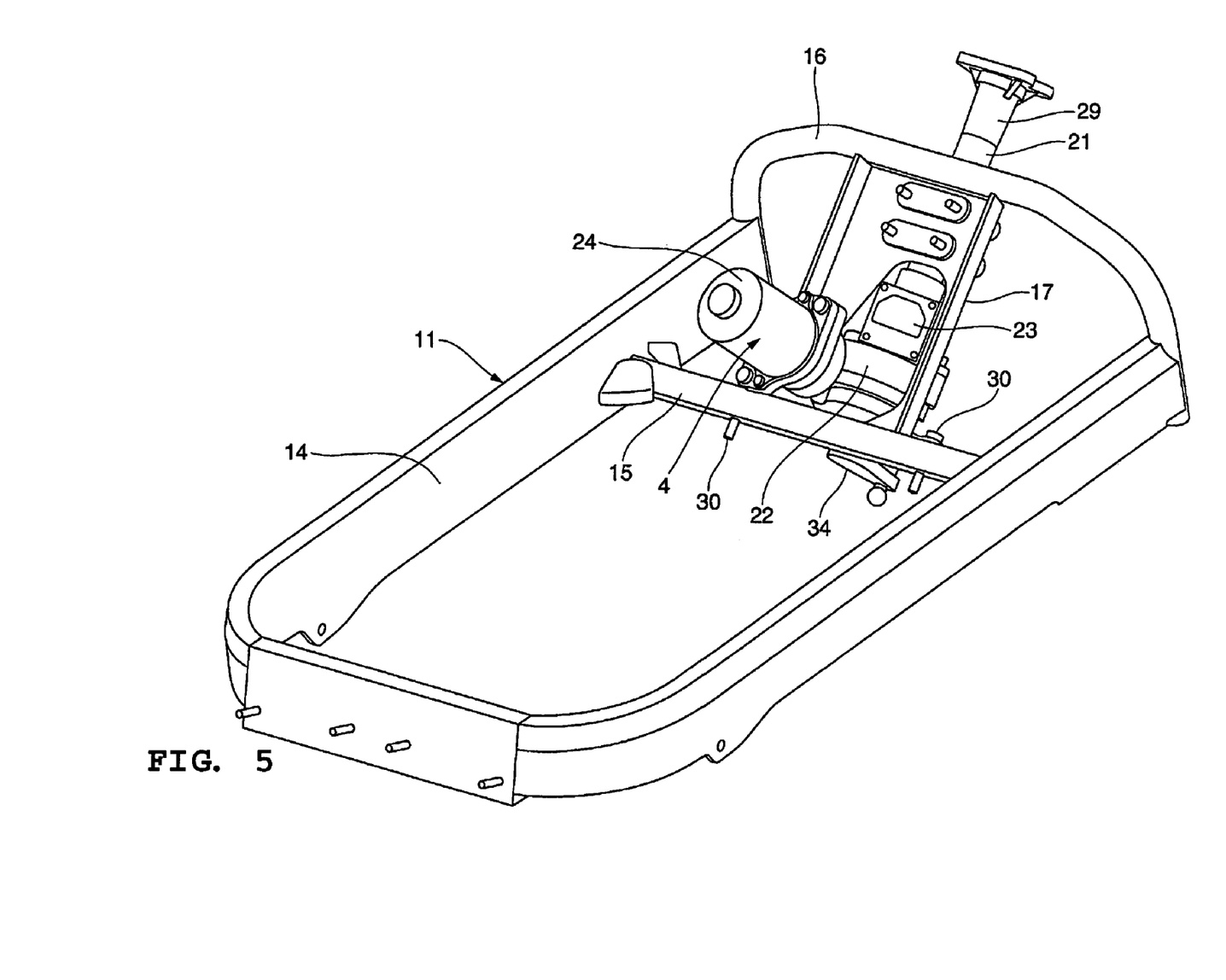
FIG. 5 is an enlarged perspective view from the top and front of the area of the frame where the power steering device and steering column of FIG. 4 are mounted.
Figure 6:
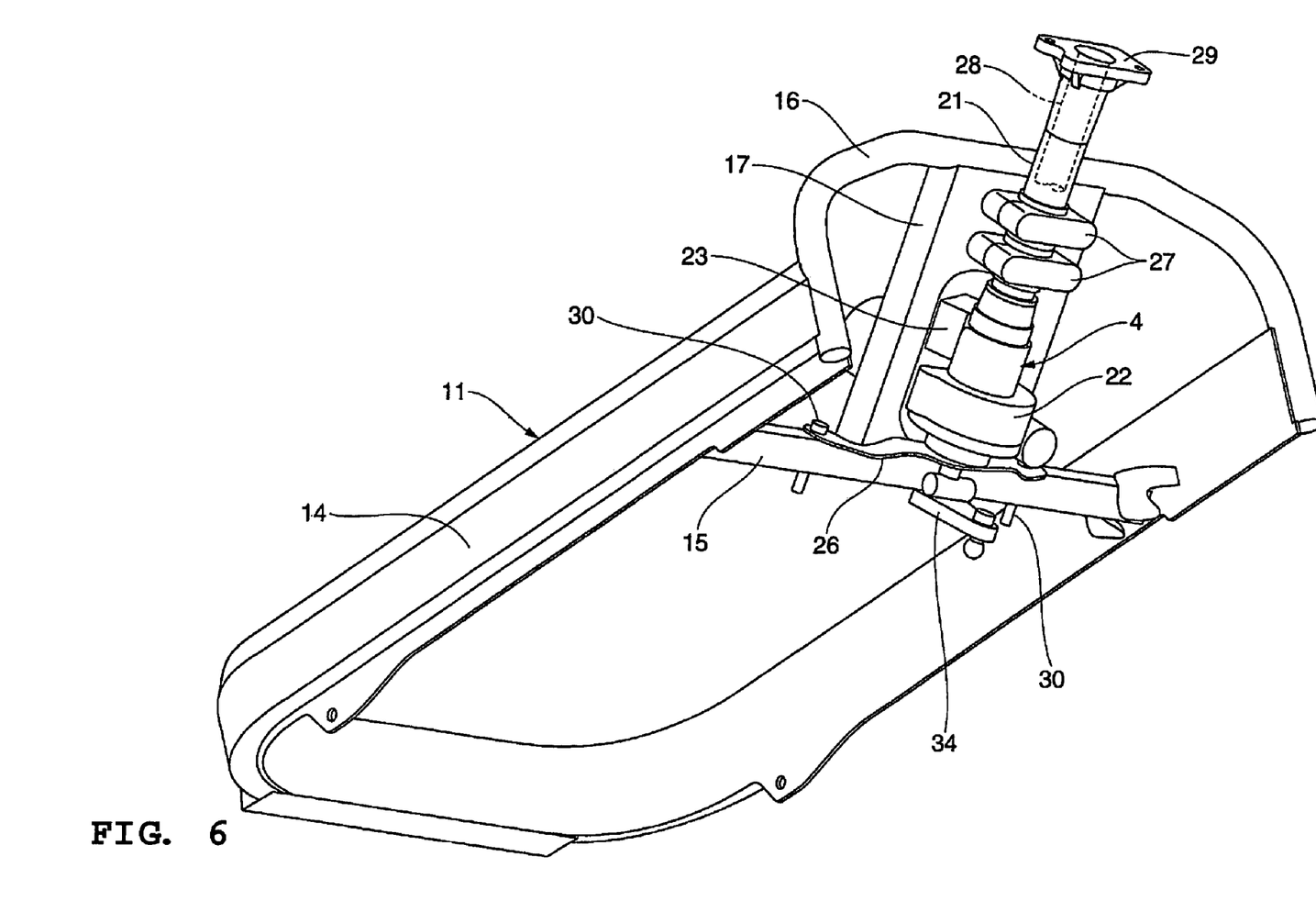
FIG. 6 is an enlarged perspective view from the bottom and rear side of the area of the frame where the power steering device of FIG. 4 is mounted.

With reference to FIGS. 3, 5 and 6, in one embodiment the upper frame 11 includes a main pipe 14, formed in a U-shape that is open to the rear. Two cross members 15, 16 are placed laterally in the rear part of the main pipe 14. A steering bracket 17 interconnects the cross members 15, 16.

With reference to FIG. 1, the steering system 8 includes the steering handlebar 7 (or other steering input mechanism), the steering shaft 28, the steering column 29, the power steering device 2, the steering linkage mechanism 32, and the steering skis 6. The steering handlebar 7 is coupled to the steering shaft 28. The steering shaft 28 is coupled to the power steering device 2. The power steering device 2 in turn is coupled to the steering linkage mechanism 32 so as to operate between the steering shaft 28 and the steering linkage mechanism 32. The steering linkage mechanism 32 is coupled to the steering skis 6. A steering force is transmitted from the steering handlebar 7 through the steering shaft 28, the power steering device 2, and the steering linkage mechanism 32 to the steering skis 6. The power steering device 2 preferably is coupled to a lower end of the steering column 21. The steering column 21 houses the steering shaft 28 and supports the steering handlebar 7.

Figure 4:
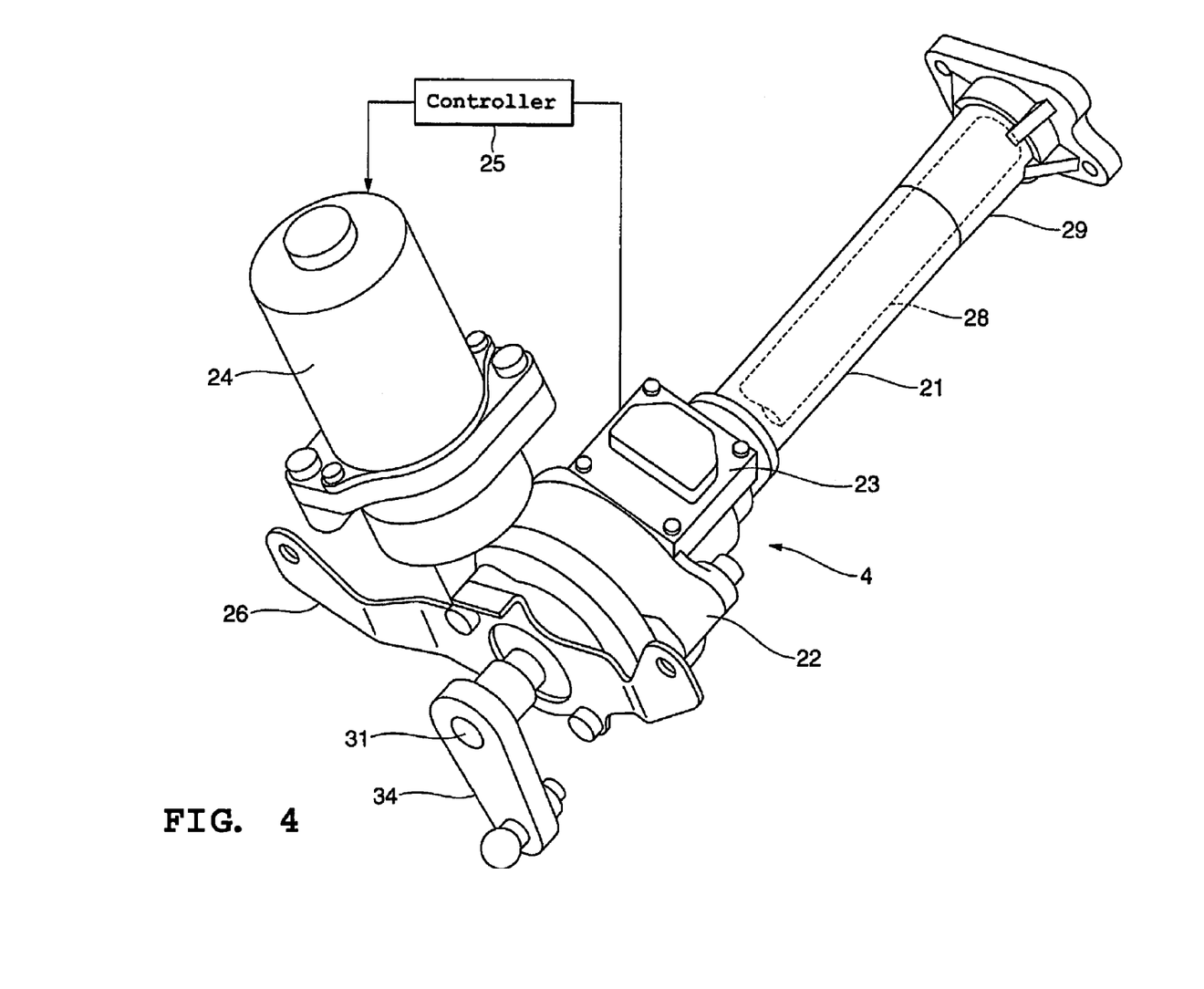
FIG. 4 is a perspective view of a power steering device coupled with a steering column of the snowmobile of FIG. 1 and schematically illustrates the interaction between a steering angle sensor, a controller and a motor of the power steering device.

As show in FIG. 4, the power steering device 2 includes a transmitting device 22, a sensor unit 23, an electric motor 24, and a controller 25. The transmitting device 22 can be attached to the lower end of the steering column 21. The steering column 21 preferably is formed in a cylindrical shape. The sensor unit 23 is coupled to the transmitting device 22. The electric motor 24 is attached to the transmitting device 22. The electric motor 24 preferably is disposed toward the front of the vehicle. The controller 25 is provided for controlling the driving force of the electric motor 24. The power steering device 2 can be mounted to the upper frame 11 by the steering column 21 and an attachment bracket 26 provided on the transmitting device 22.

With reference to FIGS. 1 and 2, the power steering device 2 in one embodiment, is located generally above and behind the upper rear side of the engine 5. The electric motor 24 of the power steering device 2 preferably is positioned toward the front of the vehicle body and extends upward and forward. The orientation of the power steering device 2 with respect to the vehicle body is not limited to the configuration describe above, but can be arranged in other suitable orientations. In other embodiments, the power steering device 2 can be oriented, for example, so that the electric motor 24 projects downward from the transmitting device 22.

With reference to FIG. 6, the steering column 21 can be made from a piece of metal formed into a cylindrical shape and secured to the steering bracket 17 of the upper frame 11 with a clamp 27. The steering column 21 preferably slopes downward and forward.

The steering shaft 28 preferably is positioned within the steering column 21. The steering shaft 28 is housed at least partially within the steering column 21 such that the steering shaft 28 is free to rotate therein. The steering handlebar 7 is coupled to the steering shaft 28. The steering handlebar 7 is attached through a handlebar post 29 to the upper end of the steering shaft 28 projecting from the steering column 21.

The input shaft (not shown) of the power steering device 2 is connected to the lower end of the steering shaft 28. The lower end of the steering shaft 28 faces the interior of the transmitting device 22. As shown in FIG. 6, on the upper frame 11, cross member 15 is located more toward the front of the vehicle body than cross member 16. The attachment bracket 26, for attaching the lower part of the power steering device 2 to the upper frame 11, is secured to the cross member 15 using attachment bolts 30.

The transmitting device 22 includes an input shaft having one end connected to the steering shaft 28. An output shaft 31 is connected to the other end of the input shaft. A reduction gear (not shown) preferably is provided for transmitting the rotation of the electric motor 24 to the output shaft 31. The transmitting device 22 is constructed so that the output shaft 31 is rotated with the resultant of the steering force (the force operating the steering handlebar 7) and the driving force of the electric motor 24.

In the illustrated embodiment, the input shaft of the power steering device 2 acts as a torsion bar. The rotary direction and the displacement amount in the torsional direction (magnitude of the steering force) of the input shaft are detected with a sensor (not shown) of the sensor unit 23. The rotary direction and the power of the electric motor 24 are controlled to correspond to the rotary direction and the displacement amount detected. In other words, the output shaft 31 of the transmitting device 22 is rotated in the same direction as the steering handlebar 7 by the combination of the steering force from the handlebar 7 and the power of the electric motor 24 corresponding to the magnitude of the steering force.

The output shaft 31 preferably is connected to the steering skis 6 through a linkage mechanism 32, shown in FIGS. 1 and 2. The steering skis 6 are coupled to a suspension system 33 as described above. The suspension system 33 allows the skis 6 to be deflected vertically. The steering skis 6 preferably can be turned laterally to steer the snowmobile. The front part of the vehicle body frame 9 is supported by the suspension system 33.

With reference to FIGS. 1 and 2, the linkage mechanism 32 includes a link rod 35 connected through a first lever 34 (FIG. 4) to the output shaft 31 of the power steering device 2. The link rod 35 extends from the first lever 34 toward the right side of the vehicle body. A transmitting shaft 37 is connected through a second lever 36 to one end of the link rod 35, on the right side of the vehicle body. The transmitting shaft 37 extends forward. A tie-rod 39 is located on the right side of the vehicle body. The tie-rod 39 is connected through a third lever 38 to the front end of the transmitting shaft 37. A tie-rod 41 is located on the left side of the vehicle body. The tie-rod 41 and the tie-rod 39 are coupled together through a parallel linkage 40 for coordinated motion.

In the illustrated embodiment, the transmitting shaft 37 preferably slopes downward and forward along the right side of the vehicle. The transmitting shaft 37 can be rotatably supported through a bracket (not shown) coupled with the vehicle body frame 9. One end of the tie-rod 39 is connected to a knuckle arm 6a for the right hand steering ski 6. One end of the tie-rod 41 is connected to a knuckle arm 6a for the left hand steering ski 6.

In the illustrated embodiment, the rotation of the output shaft 31 of the power steering device 2 is transmitted through the first lever 34, the link rod 35, and the second lever 36, to the transmitting shaft 37. As the transmitting shaft 37 rotates, the tie-rod 39, on the right side of the vehicle body, and the tie-rod 41, on the left side of the vehicle body, turn in right and left directions.

In one embodiment, a driver seated on the snowmobile 1 turns the steering handlebar 7 while the vehicle is traveling. The steering force applied by the driver to the steering handlebar 7 and the power of the electric motor 24 of the power steering device 2 are combined to generate a resultant steering force. The resultant steering force is transmitted through the linkage mechanism 32 to the right and left steering skis 6. The steering skis 6 turn in the direction that the steering handlebar 7 is turned.

In the illustrated embodiment, the power steering device 2 does not significantly disturb the weight balance of the vehicle. At least a portion of the electric motor 24 of the power steering device 2 is disposed forward of the steering shaft and extends toward the front of the vehicle body. The electric motor 24, which is relatively heavy among the components of the power steering device 2, can be located generally centrally in the transverse direction of the vehicle. Attaching the power steering device 2 to the lower end of the steering column 21 and mounting it generally centrally in the transverse direction of the vehicle minimizes the need to counter balance the power steering device 2 in the transverse direction. In other words, unlike in an arrangement in which the power steering device 2 is displaced to one side of the vehicle, it is not necessary to balance weight in the transverse direction using other components. Accordingly, in some embodiments the power steering device 2 can be placed in the center of the vehicle width so that it is unnecessary to use other components to balance weight in the transverse direction, making it possible to balance weight without sacrificing freedom in positioning components to be mounted. Positioning components generally centrally in the transverse direction of the vehicle can also improve the stability of the vehicle.

Additionally, in some embodiments, connecting the input shaft of the power steering device 2 directly to the steering shaft 28 improves the steering response characteristic compared with an arrangement in which a universal joint is interposed between the two shafts. Moreover, elimination of a universal joint reduces the number of components and manufacturing costs. Accordingly, it is possible to connect the input shaft of the power steering device directly to the steering shaft such that the power steering device can be employed without lowering the steering response characteristic.

In the illustrated embodiment, the steering skis 6 are placed on left and right sides of the engine 5, and the power steering device 2 is placed generally above and behind the engine 5. In such a configuration, the engine 5 substantially serves as a shield to inhibit snow from adhering to the power steering device 2 while the snowmobile 1 is traveling forward. Accordingly, where the engine 5 serves as a shield for preventing snow from adhering to the power steering device, it is possible, for example, to mount on snowmobiles an electric motor-operated power steering device, such as those manufactured for automobiles, without employing components specially adapted for snow and water.

As described above, the engine 5 preferably is mounted on the lower frame 10 of the vehicle body frame 9. The engine 5 can be positioned in front of the steering column 21 with the inclined axis of the cylinder 5b sloping upward and toward the rear. The electric motor 24 of the power steering device 2 preferably is disposed generally forward of the steering column 21 and generally above the engine 5. Accordingly, it is possible to concentrate mass in the vicinity of the center of gravity G of the vehicle body, as illustrated in FIG. 1. With the mass concentrated near the center of gravity of the vehicle body, running stability is further improved.

With reference to FIGS. 1 and 2, in a preferred embodiment, the steering shaft 28 of the steering assembly 8 has an inclined steering axis. The steering axis preferably extends generally upward and generally toward the rear portion of the snowmobile 1. The electric motor 24 of the power steering device 2 has an inclined motor axis. As shown in the illustrated embodiment, the motor axis extends generally upward and generally toward the front portion of the snowmobile 1. The motor axis preferably is oriented generally normal to the steering axis. The cylinder 5b of the internal combustion engine 5 has an inclined cylinder axis, as described above. With reference to FIG. 1, the steering axis lies generally within a first inclined plane and the cylinder axis lies generally within a second inclined plane. The second inclined plane preferably is generally parallel to the first inclined plane. The motor axis lies generally within a third inclined plane. The third inclined plane preferably is generally normal to the first and second inclined planes.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In particular, while the present steering system has been described in the context of particularly preferred embodiments, the skilled artisan will appreciate, in view of the present disclosure, that certain advantages, features and aspects of the steering system may be realized in a variety of other applications, many of which have been noted above. For example, while particularly useful for snowmobiles, the skilled artisan can readily adopt the principles and advantages described herein to a variety of other applications, including larger scale devices. Additionally, it is contemplated that various aspects and features of the invention described can be practiced separately, combined together, or substituted for one another, and that a variety of combinations and subcombinations of the features and aspects can be made and still fall within the scope of the invention. Thus, it is intended that the scope of the present invention herein disclosed should not be limited by the particular disclosed embodiments described above, but should be determined only by a fair reading of the claims that follow.

What is claimed is:

1. A snowmobile comprising a frame assembly, an internal combustion engine mounted to the frame assembly, and a steering assembly mounted to the frame assembly, the steering assembly comprising a steering shall having a first portion and a second portion, the first portion of the steering shaft being coupled to a steering input mechanism, the second portion of the steering shaft being coupled to a power steering device, the power steenng device being coupled to a steering linkage, and the steering linkage being coupled to at least one steering ski, the power steering device being positioned generally about a longitudinally and vertically extending center plane of the snowmobile.

2. The snowmobile of claim 1, further comprising another steering ski coupled with the at least one steering ski through the steering linkage.

3. The snowmobile of claim 1, wherein the power steering device comprises an input shaft, and the input shaft is coupled directly to the steering shaft.

4. The snowmobile of claim 1, wherein the internal combustion engine is positioned generally in front of and generally below, the power steering device.

5. The snowmobile of claim 1, wherein a height of the power steering device relative to a surface supporting the first steering ski is greater than a height of the internal combustion engine relative to a surface supporting the first steering ski.

6. The snowmobile of claim 1, wherein a portion of the power steering device is located a first distance from a portion of the first steering ski, a portion of the internal combustion engine is located a second distance from the portion of the first steering ski, and The first distance is greater than the second distance.

7. The snowmobile of claim 1, wherein a center of mass of the power steering device is positioned higher than a center of mass of the internal combustion engine relative to a surface supporting the first steering ski.

8. The snowmobile of claim 1, wherein a center of mass of the power steering device is positioned closer to a rear portion of the snowmobile than a center of mass of the internal combustion engine is positioned.

9. The snowmobile of claim 1, wherein the steering shaft is positioned generally about a longitudinally and vertically extending center plane of the snowmobile.

10. The snowmobile of claim 1, wherein the power steering device comprises an electric motor, and the electric motor is positioned generally about a longitudinally and vertically extending center plane of the snowmobile.

11. The snowmobile of claim 1, wherein the power steering device comprises an electric motor, and at least a portion of the electric motor is disposed generally forward of the steering shaft.

12. The snowmobile of claim 1, wherein the internal combustion engine is positioned generally closer to a front portion of the snowmobile than is the steering shaft.

13. The snowmobile of claim 1, wherein the internal combustion engine comprises a cylinder having an inclined cylinder axis that extends generally upward and generally toward a rear portion of the snowmobile.

14. The snowmobile of claim 1, wherein the power steering device comprises an electric motor, and at least a portion of the electric motor is disposed generally above the internal combustion engine.

15. The snowmobile of claim 1, wherein the internal combustion engine comprises a cylinder having an inclined cylinder axis that extends generally upward and generally toward a rear portion of the snowmobile, and wherein the power steering device comprises an electric motor, and at least a portion of the electric motor is disposed generally above the internal combustion engine, to concentrate mass near a center of gravity of the snowmobile.

16. The snowmobile of claim 1, wherein the steering shaft has a steering axis, the internal combustion engine comprises a cylinder having a cylinder axis, and the power steering device comprises an electric motor having a motor axis, wherein the steering axis lies within a first plane, the cylinder axis lies within a second plane generally parallel to the first plane, and the motor axis lies within a third plane generally normal to the first and second planes.

17. A snowmobile comprising a frame assembly, an internal combustion engine mounted to the frame assembly, and a steering assembly mounted to the frame assembly, the steering assembly comprising a steering shaft having a first portion and a second portions the first portion of the steering shaft being coupled to a steering input mechanism, the second portion of the steering shaft being directly coupled to an input shaft of a power steering device, an output shaft of the power steering device being coupled to a steering linkage, and the steering linkage being coupled to at least one steering ski, the power steering device being positioned generally about a longitudinally and vertically extending center plane of the snowmobile.

18. A snowmobile comprising a frame assembly, an internal combustion engine mounted to die frame assembly, and a steering assembly mounted to the frame assembly, the steering assembly comprising a steering shaft having a first portion and a second portion, the first portion of the steering shaft being coupled to a steering input mechanism, the second portion of the steering shaft being coupled to a power steering device, the power steering device being coupled to a steering linkage, and the steering linkage being coupled to at least one steering ski, the internal combustion engine being positioned generally in front of, and generally below, the power steering device.

19. A snowmobile comprising a frame assembly, an internal combustion engine mounted to the frame assembly, and a steering assembly mounted to the frame assembly, the steering assembly comprising a steering shaft having a first portion, a second portion and a steering axis, the first portion of the steering shaft being coupled to a steering input mechanism, the second portion of the steering shaft being coupled to a power steering device, the power steering device comprising an electric motor having a motor axis, the motor axis being oriented generally normal to the steering axis, the power steering device being coupled to a steering linkage, and the steering linkage being coupled to at least one steering ski.

20. The snowmobile of claim 19, wherein the internal combustion engine comprises a cylinder having a cylinder axis, and wherein the steering axis lies within a first plane and the cylinder axis lies within a second plane generally parallel to the first plane.

21. The snowmobile of claim 20, wherein the motor axis lies within a third plane generally normal to the first and second planes.

22. A snowmobile, comprising a frame assembly, an internal combustion engine mounted to the frame assembly, a transmission system coupled to the engine, a drive track system disposed below a seat portion, the drive track system coupled to the frame assembly and coupled to the transmission system, the drive tack system comprising a drive track belt and a drive track suspension system, and a steering assembly mounted to the frame assembly, the steering assembly comprising a steering shaft having a first portion and a second portion, the first portion of the steering shaft being coupled to a steering input mechanism, the second portion of the steering shaft being coupled to a power steering device, the power steering device being coupled to a steering linkage, and the steering linkage being coupled to at least a pair of steering skis, the power steering device being positioned generally about a longitudinally and vertically extending center plane of the snowmobile.

23. The snowmobile of claim 18, wherein a height of the power steering device relative to a surface supporting the first steering ski is greater than a height of the internal combustion engine relative to a surface supporting the first steering ski.

24. The snowmobile of claim 18, wherein a portion of the power steering device is located a first distance from a portion of the first steering ski, a portion of the internal combustion engine is located a second distance from the portion of the first steering ski, and the first distance is greater than the second distance.

25. The snowmobile of claim 18, wherein a center of mass of the power steering device is positioned higher than a center of mass of the internal combustion engine relative to a surface supporting the first steering ski.

26. The snowmobile of claim 18, wherein a center of mass of the power steering device is positioned closer to a rear portion of the snowmobile than a center of mass of the internal combustion engine is positioned.

27. The snowmobile of claim 18, wherein the steering shaft is positioned generally about a longitudinally and vertically extending center plane of the snowmobile.

28. The snowmobile of claim 18, wherein the internal combustion engine is positioned generally closer to a front portion of the snowmobile than is the steering shaft.

29. The snowmobile of claim 18, wherein the internal combustion engine comprises a cylinder having an inclined cylinder axis that extends generally upward and generally toward a rear portion of the snowmobile.

* * * * *

UNITED STATES PATENT AND TRADEMARK OFFICE
CERTIFICATE OF CORRECTION

| | |
|---|---|
| PATENT NO. | : 7,096,988 B2 |
| APPLICATION NO. | : 10/913958 |
| DATED | : August 29, 2006 |
| INVENTOR(S) | : Takashi Moriyama |

Page 1 of 1

It is certified that error appears in the above-identified patent and that said Letters Patent is hereby corrected as shown below:

At Col. 9, Line 28 (approx.), In Claim 1, delete "shall" and insert -- shaft --, therefor.

At Col. 9, Line 32 (approx.), In Claim 1, delete "steenng" and insert -- steering --, therefor.

At Col. 9, Line 44, In Claim 4, delete "of" and insert -- of, --, therefor.

At Col. 9, Line 55, In Claim 6, delete "The" and insert -- the --, therefor.

At Col. 10, Line 40, In Claim 17, delete "portions" and insert -- portion, --, therefor.

At Col. 10, Line 50, In Claim 18, delete "die" and insert -- the --, therefor.

At Col. 11, Line 20, In Claim 22, delete "tack" and insert -- track --, therefor.

At Col. 11, Line 24, In Claim 22, delete "shalt" and insert -- shaft --, therefor.

Signed and Sealed this

Sixth Day of March, 2007

JON W. DUDAS
*Director of the United States Patent and Trademark Office*